(12) United States Patent
Matsuoka et al.

(10) Patent No.: US 10,608,515 B2
(45) Date of Patent: Mar. 31, 2020

(54) SYNCHRONOUS MOTOR

(71) Applicant: Mitsubishi Electric Corporation, Tokyo (JP)

(72) Inventors: Atsushi Matsuoka, Tokyo (JP); Hiroyuki Ishii, Tokyo (JP); Hiroki Aso, Tokyo (JP); Yuto Urabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 537 days.

(21) Appl. No.: 15/324,838

(22) PCT Filed: Aug. 29, 2014

(86) PCT No.: PCT/JP2014/072768
§ 371 (c)(1),
(2) Date: Jan. 9, 2017

(87) PCT Pub. No.: WO2016/031057
PCT Pub. Date: Mar. 3, 2016

(65) Prior Publication Data
US 2017/0222525 A1    Aug. 3, 2017

(51) Int. Cl.
*H02K 21/14* (2006.01)
*H02K 1/27* (2006.01)
*H02K 21/16* (2006.01)
*H02K 1/14* (2006.01)

(52) U.S. Cl.
CPC ............ *H02K 21/14* (2013.01); *H02K 1/146* (2013.01); *H02K 1/2706* (2013.01);
(Continued)

(58) Field of Classification Search
None
See application file for complete search history.

(56) References Cited

U.S. PATENT DOCUMENTS 6,541,887 B2 *  4/2003  Kawamura ............ B60K 6/26
                                                310/181
2006/0055266 A1    3/2006  Iwami et al.
(Continued)

FOREIGN PATENT DOCUMENTS

JP    H06-217478 A    8/1994
JP    H08-126287 A    5/1996
(Continued)

OTHER PUBLICATIONS

Office Action dated Jul. 3, 2018 in corresponding Chinese Patent Application No. 201480081476.0 (and English translation).
(Continued)

*Primary Examiner* — Jue Zhang
*Assistant Examiner* — Henry E Lee, III
(74) *Attorney, Agent, or Firm* — Posz Law Group, PLC

(57) ABSTRACT

A synchronous motor includes: a stator core formed by stacking, in the axial direction, magnetic steel sheets stamped into a specific shape; and a cylindrical permanent magnet having magnetic poles formed on its outer circumferential surface and having polar anisotropic orientation corresponding to the number of magnetic poles. The permanent magnet is longer than the stator core in an axial direction. Grooves are formed in a portion of an outer circumferential surface of the permanent magnet that is opposed to the stator core and in a portion of the outer circumferential surface of the permanent magnet that is not opposed to the stator core and is located only on one side in the axial direction, and the grooves extends in the axial direction and are formed at a fixed interval in a rotation direction at an inter-magnetic pole portion.

8 Claims, 4 Drawing Sheets

(52) U.S. Cl.
CPC ........... *H02K 1/2733* (2013.01); *H02K 21/16* (2013.01); *H02K 2201/03* (2013.01); *H02K 2213/03* (2013.01)

(56) References Cited

U.S. PATENT DOCUMENTS

| | | | |
|---|---|---|---|
| 2008/0030095 A1 | 2/2008 | Iizuka et al. | |
| 2013/0026877 A1* | 1/2013 | Matsuda | H02K 23/04 310/216.106 |
| 2015/0115760 A1* | 4/2015 | Tsuchiya | H02K 1/2713 310/156.49 |

FOREIGN PATENT DOCUMENTS

| | | |
|---|---|---|
| JP | H09-093895 A | 4/1997 |
| JP | 11-234930 A | 8/1999 |
| JP | 2001-238420 A | 8/2001 |
| JP | 2004-088855 A | 3/2004 |
| JP | 2005-057945 A | 3/2005 |
| JP | 2006-086319 A | 3/2006 |
| JP | 2006-304472 A | 11/2006 |
| JP | 2006-311777 A | 11/2006 |
| JP | 2008-043031 A | 2/2008 |
| JP | 2009-189155 A | 8/2009 |

OTHER PUBLICATIONS

International Search Report of the International Searching Authority dated Nov. 18, 2014 for the corresponding international application No. PCT/JP2014/072768 (and English translation).

Office Action dated Jul. 25, 2017 issued in corresponding JP patent application No. 2016-545200 (and partial English translation).

\* cited by examiner

SYNCHRONOUS MOTOR

CROSS REFERENCE TO RELATED APPLICATION

This application is a U.S. national stage application of International Patent Application No. PCT/JP2014/072768 filed on Aug. 29, 2014, the disclosure of which is incorporated herein by reference.

TECHNICAL FIELD

The present invention relates to a synchronous motor that rotates a rotor by using a magnetic force of a permanent magnet used in the rotor and a magnetic force generated by passing a current through a winding wound around a stator.

BACKGROUND

In a synchronous motor using a permanent magnet, torque is generated by the interaction between the magnetic force of the permanent magnet used in the rotor and the magnetic force generated by passing a current through the windings wound around the stator, and the rotor is thus rotated. The generated torque is generally in proportion to the magnitude of the current. However, when a large current is made to flow in order to obtain larger torque, irreversible demagnetization is caused to the permanent magnet of the rotor by the strong magnetic flux generated by the stator, and thus the magnetic flux generated by the rotor is reduced and the torque is also reduced.

In particular, in a rotor with a permanent magnet that has polar anisotropic orientation, the thickness in the radial direction of the inter-magnetic pole portions is small and the easy-magnetization direction of the inter-magnetic pole portions is in the rotation direction. Therefore, when a current is made to flow through the winding, the magnetic flux concentrates on a slot opening of a stator core and, because of the opposing magnetic field generated by the stator, the permanent magnet of the inter-magnetic pole portion is directly exposed to an opposing magnetic field, which means that irreversible demagnetization can easily occur.

In the conventional synchronous motor described in Patent Literature 1 listed below, grooves extending in an axial direction are formed on the inter-magnetic pole portions on the surface of the outer circumferential surface of the permanent magnet, with the surface being opposed to the stator core. By providing the grooves on the outer circumferential surface of the rotor, the conventional synchronous motor can suppress the reduction in the amount of magnetic flux caused by irreversible demagnetization of the permanent magnet due to the application of an opposing magnetic field.

PATENT LITERATURE

Japanese Patent Application Laid-open No. 2004-88855

Having a configuration in which the grooves are provided on the outer circumferential surface of the rotor is, however, the same as broadening the gap between the rotor and the stator core; therefore, this configuration reduces the amount of magnetic flux interlinking with the windings around the stator core from the permanent magnet of the rotor. Consequently, it is difficult to improve the torque only by providing the grooves on the surface of the permanent magnet as in the conventional rotor represented by Patent Literature 1 described above.

SUMMARY

The present invention has been achieved in view of the above problems, and an object of the present invention is to obtain a synchronous motor that can improve torque even when using a rotor that uses a permanent magnet that has polar anisotropic orientation.

In order to solve the above problems and achieve the object, an aspect of the present invention is a synchronous motor including: a stator core; a rotor disposed on an inner diameter side of the stator core; and a cylindrical permanent magnet disposed in an outer circumferential section of the rotor and having polar anisotropic orientation. The permanent magnet is longer than the stator core in an axial direction, and grooves are formed in a portion of an outer circumferential surface of the permanent magnet that is opposed to the stator core and in a portion of the outer circumferential surface of the permanent magnet that is not opposed to the stator core and is located only on one side in the axial direction, the grooves extending in the axial direction and being formed at a fixed interval in a rotation direction at an inter-magnetic pole portion.

According to the present invention, an effect is obtained where it is possible to improve torque even when using a rotor that uses a permanent magnet that has polar anisotropic orientation.

DETAILED DESCRIPTION

Embodiments of a synchronous motor according to the present invention will be explained below in detail with reference to the accompanying drawings. The present invention is not limited to the embodiments.

First Embodiment

Figure 1:
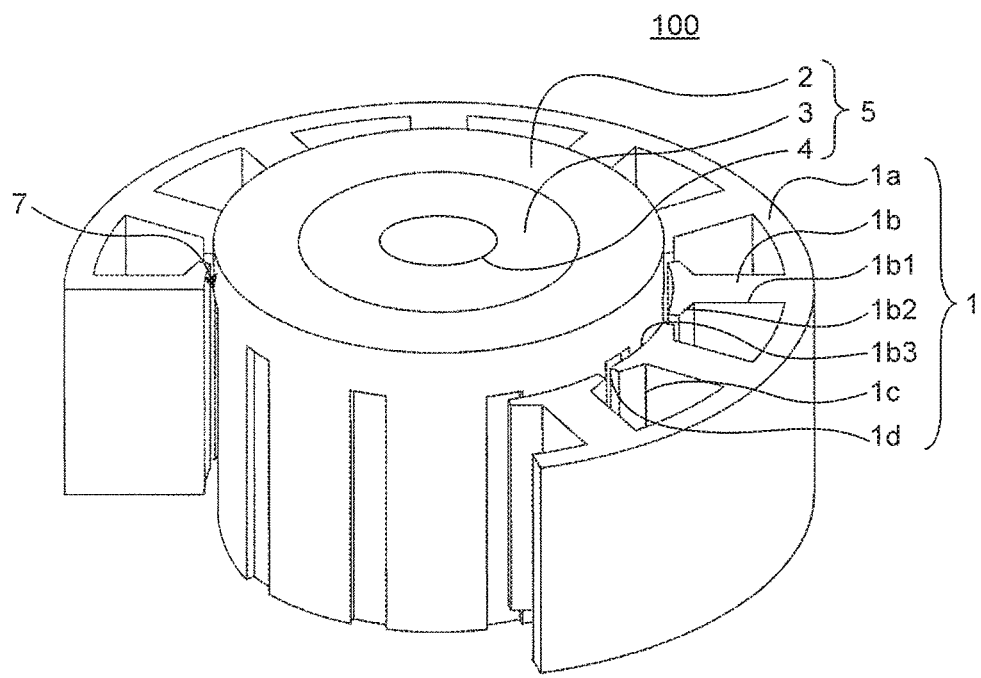
FIG. 1 is a perspective view of a synchronous motor according to a first embodiment of the present invention.
Figure 2:
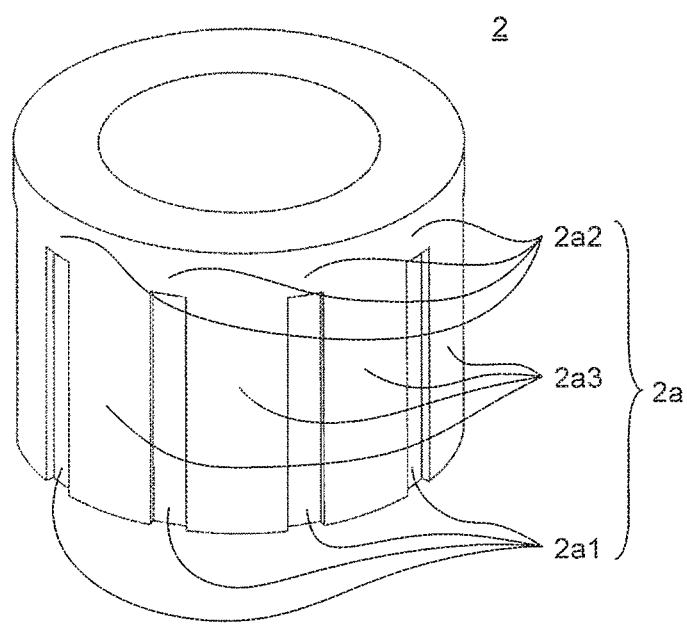
FIG. 2 is a perspective view of a permanent magnet illustrated in FIG. 1.
Figure 3:
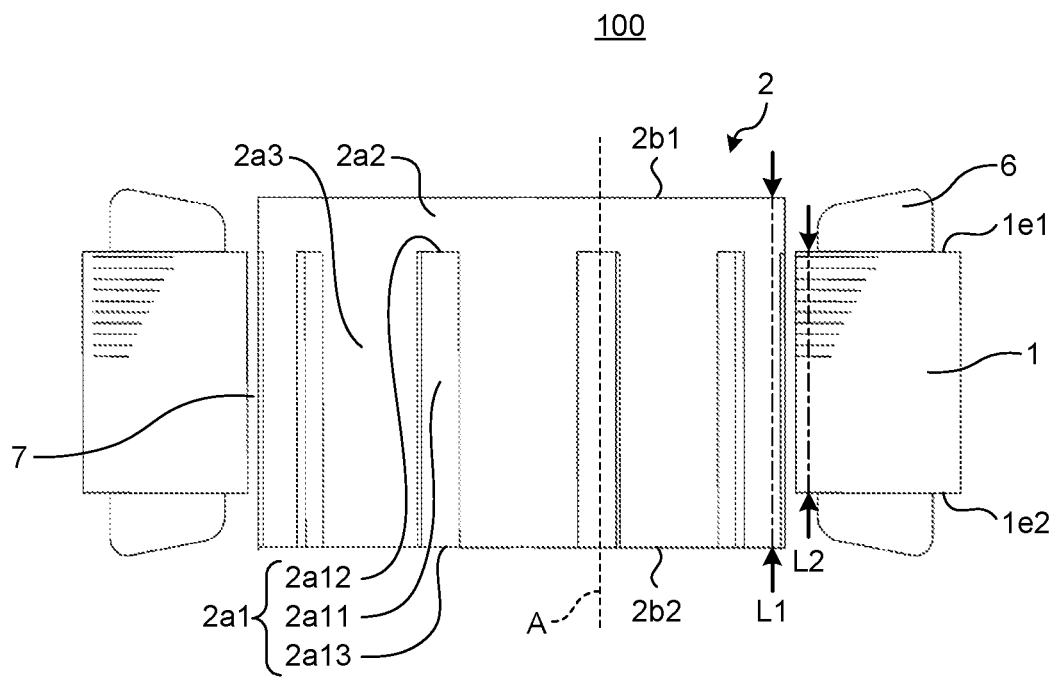
FIG. 3 is a side view of the synchronous motor illustrated in FIG. 1.

FIG. 1 is a perspective view of a synchronous motor according to a first embodiment of the present invention. FIG. 2 is a perspective view of a permanent magnet illustrated in FIG. 1. FIG. 3 is a side view of the synchronous motor illustrated in FIG. 1.

A synchronous motor 100 illustrated in FIG. 1 includes a stator core 1 and a rotor 5 disposed on the inner diameter side of the stator core 1 with a gap 7 therebetween. In FIG. 1, windings 6 illustrated in FIG. 3 are omitted.

The stator core 1 includes an annular yoke 1a formed by stacking, in an axial direction, a plurality of magnetic steel sheets that are stamped into a specific shape, and a plurality of teeth 1b that are disposed at fixed intervals in a rotation direction on the inner diameter side of the yoke 1a and that extend from the yoke 1a toward the center of the yoke 1a.

The tooth 1b includes a winding portion 1b1 around which the winding 6 illustrated in FIG. 3 is wound, and an umbrella tip end portion 1b2 that is formed on the inner diameter side of the individual tooth 1b and that has a rotor-opposing face 1b3 spreading in the rotation direction.

In the stator core 1, a plurality of slots 1c and a plurality of slot openings 1d are formed. The slot 1c is a space sectioned by the yoke 1a, the winding portions 1b1, and the end portions 1b2, and accommodates the winding 6 therein. The slot opening 1d is a space formed in a portion where the rotation direction ends of adjacent end portions 1b2 are opposed to each other.

The rotor 5 includes an annular rotor core 3 formed by stacking, in the axial direction, a plurality of magnetic steel sheets that are stamped into a specific shape; a cylindrical permanent magnet 2 that is disposed on the outer circumferential side of the rotor core 3, has a plurality of magnetic poles formed on its outer circumferential surface 2a, and has polar anisotropic orientation corresponding to the number of magnetic poles; and a rotating shaft 4 disposed at the radially central portion of the rotor core 3.

Assuming that the length from one axial end face 2b1 to the other axial end face 2b2 of the permanent magnet 2 is a length L1 in the axial direction of the permanent magnet 2 and the length from one axial end face 1e1 to the other axial end face 1e2 of the stator core 1 is a length L2 in the axial direction of the stator core 1, the length L1 in the axial direction of the permanent magnet 2 is larger than the length L2 in the axial direction of the stator core 1.

As illustrated in FIGS. 2 and 3, the outer circumferential surface 2a of the permanent magnet 2 has a plurality of grooves 2a1, an axial-end side face 2a2, and a plurality of magnetic-pole outer circumferential surfaces 2a3 formed thereon.

The grooves 2a1 are formed at inter-magnetic pole portions A in a portion opposed to the stator core 1 of the outer circumferential surface 2a of the permanent magnet 2. Each of the grooves 2a1 in the illustrated example has a shape in which a bottom face 2a11 extends from an axial end face 2a12 on the side of the axial-end side face 2a2 to an axial end portion 2a13. The grooves 2a1 in the illustrated example are formed not only in the portion opposed to the stator core 1 but also in a portion not opposed to the stator core 1.

The axial-end side face 2a2 is a portion of the outer circumferential surface 2a of the permanent magnet 2 that is not opposed to the stator core 1 on the side of the axial end face 2b1 of the permanent magnet 2. The axial-end side face 2a2 is located between the grooves 2a1 and the axial end face 2b1. The magnetic-pole outer circumferential surfaces 2a3 are located in the outer circumferential surfaces of the magnetic poles in the outer circumferential surface 2a of the permanent magnet 2, and are formed such that they spread from the axial end face 2b2 to the axial-end side face 2a2.

As described above, the permanent magnet 2 is longer than the stator core 1 in the axial direction; is provided with the grooves 2a1 at the inter-magnetic pole portions A in the portion of the outer circumferential surface 2a of the permanent magnet 2 that is opposed to the stator core 1; and is also provided with the grooves 2a1 in the portion of the outer circumferential surface 2a of the permanent magnet 2 that is not opposed to the stator core 1 and is located on one side of the permanent magnet 2 in the axial direction.

Figure 4:
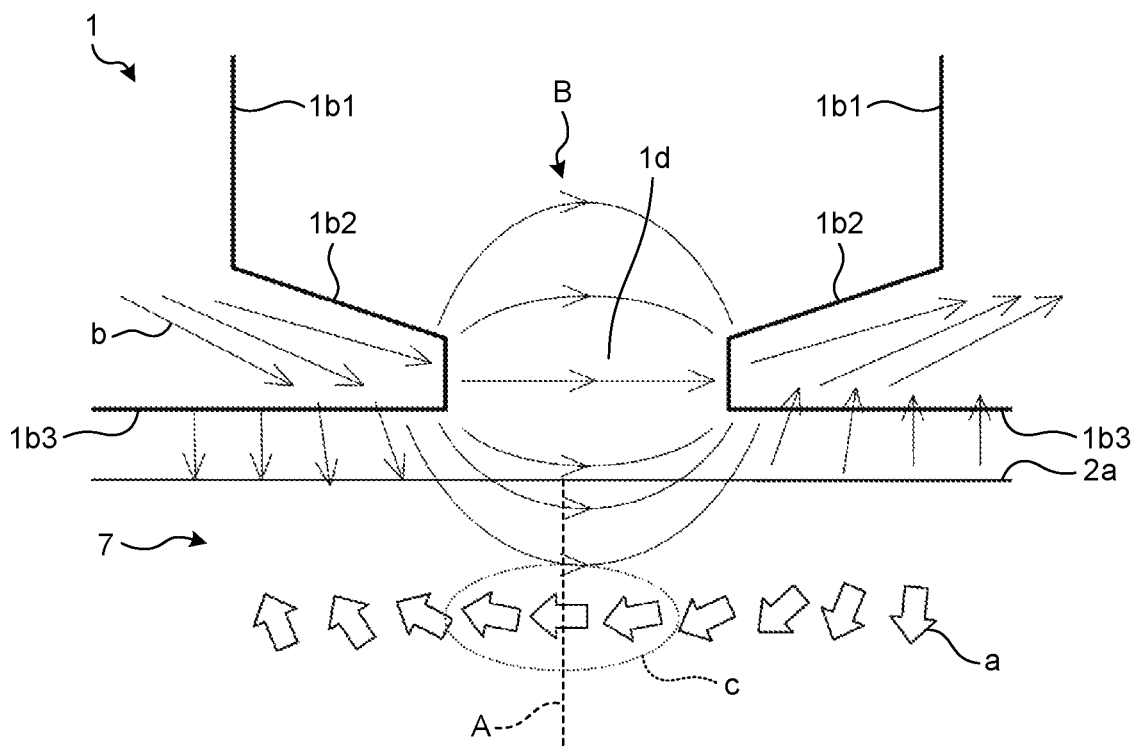
FIG. 4 is a diagram illustrating a portion of a permanent magnet where irreversible demagnetization can easily occur.

FIG. 4 is a diagram illustrating a portion of the permanent magnet where irreversible demagnetization can easily occur. FIG. 4 is an enlarged illustration of the winding portions 1b1, the end portions 1b2, the rotor-opposing faces 1b3, and the outer circumferential surface 2a of the permanent magnet 2. Arrows designated by the letter a represent an easy-magnetization direction of the permanent magnet 2, which has polar anisotropic orientation. Arrows designated by the letter b represent the path of the magnetic flux generated when a current is made to flow through the winding 6 illustrated in FIG. 3. A region indicated by the letter c represents a portion where irreversible demagnetization occurs at the inter-magnetic pole portion A of the permanent magnet 2.

The easy-magnetization direction a is parallel to the outer circumferential surface 2a of the permanent magnet 2. A portion of the magnetic flux generated when a current is made to flow through the winding 6 illustrated in FIG. 3 can be easily short-circuited between the adjacent end portions 1b2, and the magnetic flux concentrates on the slot opening 1d. In particular, in a case where a large current is made to flow through the winding 6, a strong magnetic flux parallel to the rotor-opposing face 1b3 is generated in a rotation direction center portion B of the slot opening 1d. This magnetic flux is applied to the permanent magnet 2 that is oriented in the rotation direction at the inter-magnetic pole portion A as a magnetic field in an opposing direction. Because of this opposing magnetic field, irreversible demagnetization occurs in the region designated by the letter c in the permanent magnet 2 at the inter-magnetic pole portion A.

The permanent magnet 2 according to the present embodiment is provided with the grooves 2a1 at the inter-magnetic pole portions A in the portion opposed to the stator core 1 of the outer circumferential surface 2a. By providing the grooves 2a1, it is possible to increase the distance between the portion indicated by the letter c and the slot opening 1d, and therefore irreversible demagnetization caused by the opposing magnetic field generated in the slot opening 1d can be suppressed. Further, because irreversible demagnetization by the opposing magnetic field is suppressed, it is possible to make a large current flow through the winding 6, and therefore the torque of the synchronous motor 100 can be improved.

However, having a configuration in which the grooves 2a1 are provided on the outer circumferential surface 2a of the permanent magnet 2 is the same as broadening the gap 7. Therefore, the amount of magnetic flux interlinking with the winding 6 from the permanent magnet 2 is reduced. As a measure against this reduction, the permanent magnet 2 is configured to effectively use the magnetic flux of a portion of the permanent magnet 2 that protrudes from both end portions of the stator core 1.

Figure 5:
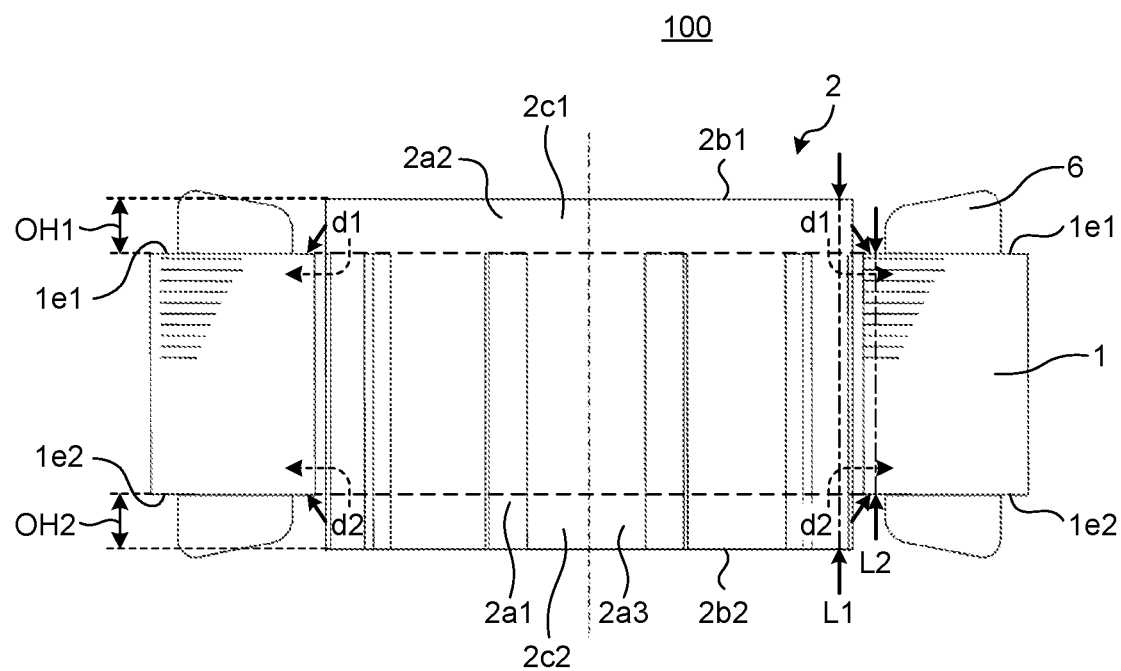
FIG. 5 is a diagram illustrating magnetic fluxes flowing from overhanging portions of the permanent magnet to a stator core.

FIG. 5 is a diagram illustrating magnetic fluxes flowing from overhanging portions of the permanent magnet to the stator core. An overhanging length OH1 represents the difference between the length from the axial center position of the permanent magnet 2 to the axial end face 2b1 and the length from the axial center position of the stator core 1 to the axial end face 1e1. An overhanging length OH2 represents the difference between the length from the axial center position of the permanent magnet 2 to the axial end face 2b2 and the length from the axial center position of the stator core 1 to the axial end face 1e2. An overhanging portion 2c1 is an axial end portion of the permanent magnet 2 corresponding to the overhanging length OH1. An overhanging portion 2c2 is an axial end portion of the permanent magnet 2 corresponding to the overhanging length OH2.

A magnetic flux d1 exiting from the overhanging portion 2c1 of the permanent magnet 2 is drawn to a soft magnetic material having a high magnetic permeability and interlinks with the stator core 1. Similarly, a magnetic flux d2 of the overhanging portion 2c2 of the permanent magnet 2 interlinks with the stator core 1.

In this manner, the synchronous motor 100 is configured to suppress the effect of an opposing magnetic field in order to improve the torque by being provided with the grooves 2a1 in the portion opposed to the stator core 1 of the outer circumferential surface 2a of the permanent magnet 2. The synchronous motor 100 is also configured to further improve the torque by using the magnetic fluxes d1 and d2 of the overhanging portions 2c1 and 2c2 that are not opposed to the stator core 1.

The overhanging portions 2c1 and 2c2 do not have to include the grooves 2a1, because the overhanging portions 2c1 and 2c2 are less affected by the opposing magnetic field from the stator core 1. Meanwhile, in a case where the permanent magnet 2 is manufactured by injection molding, it is difficult to separate the permanent magnet 2 from a mold when the grooves 2a1 are provided only in the axial center portion of the outer circumferential surface 2a of the permanent magnet 2.

Therefore, in the permanent magnet 2 in the illustrated example, a portion having no grooves 2a1, i.e., the axial-end side face 2a2 is provided only between the grooves 2a1 and the axial end face 2b1 in the outer circumferential surface 2a of the permanent magnet 2. With this configuration, it is possible to manufacture the permanent magnet 2 having a plurality of magnetic poles on its surface by injection molding; therefore, an inexpensive rotor can be achieved. Further, the permanent magnet 2 can be produced by a manufacturing method and a manufacturing facility that are the same as conventional ones; therefore, an increase in manufacturing costs can be suppressed.

Although both the axial end portions of the permanent magnet 2 according to the present embodiment protrude from the axial end portions of the stator core 1, only one of the axial end portions can be configured to protrude from the axial end portion of the stator core 1. Also with this configuration, it is possible to improve the torque by using the magnetic flux of the overhanging portion. Further, although the rotor core 3 and the rotating shaft 4 are used in the rotor 5 according to the present embodiment, the rotating shaft 4 with an increased diameter can be used instead of using the rotor core 3.

Second Embodiment

Figure 6:
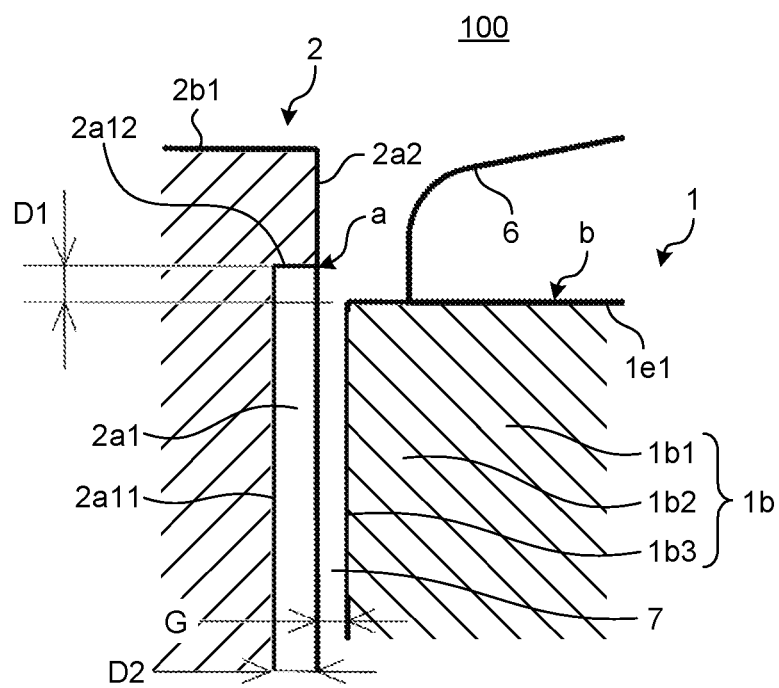
FIG. 6 is an enlarged partial view of a synchronous motor according to a second embodiment of the present invention.
Figure 7:
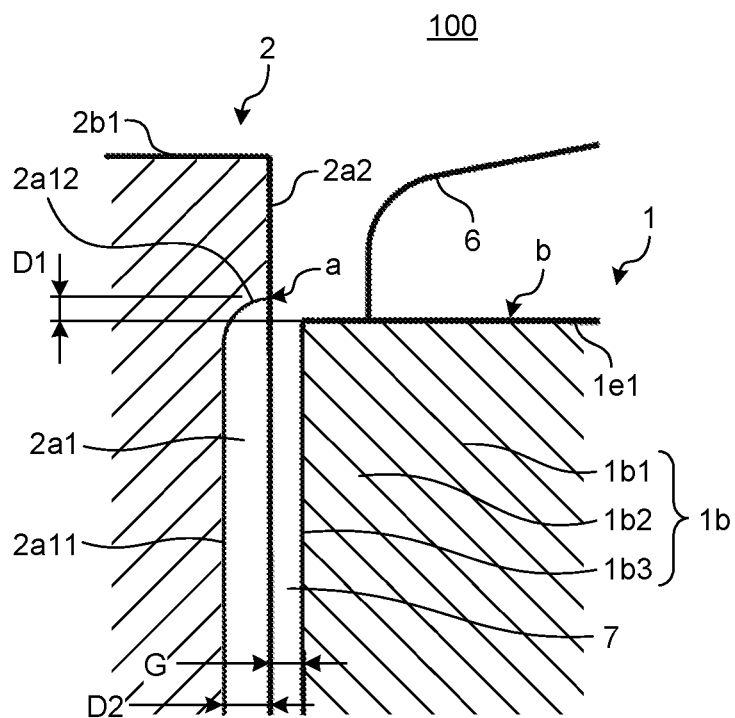
FIG. 7 is a diagram illustrating an example in which a groove shape illustrated in FIG. 6 is modified.
Figure 8:
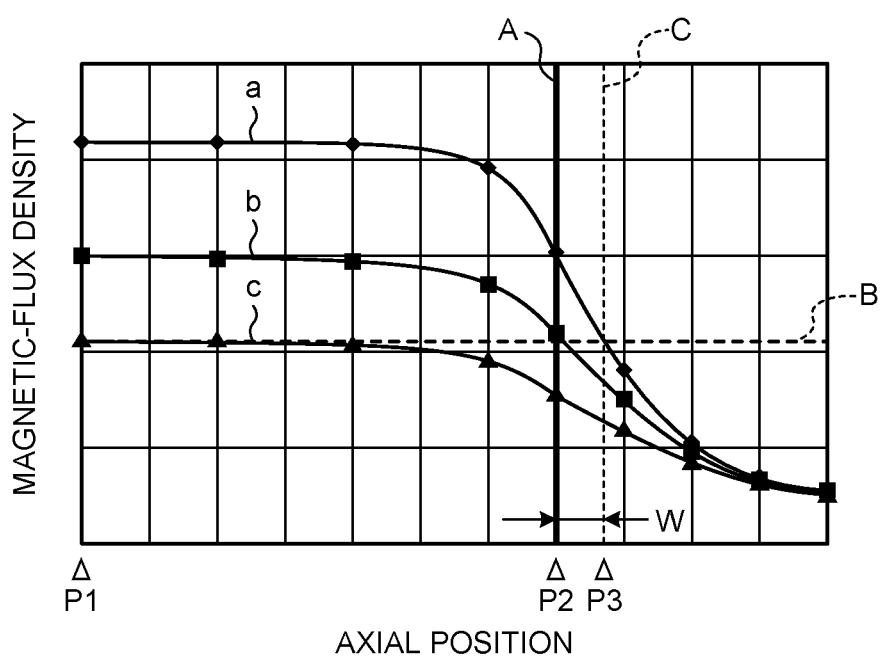
FIG. 8 is a diagram illustrating the magnetic-flux density distribution around a slot opening of a stator core is obtained by a magnetic field analysis.

FIG. 6 is an enlarged partial view of a synchronous motor according to a second embodiment of the present invention. FIG. 7 is a diagram illustrating an example in which the groove shape illustrated in FIG. 6 is modified. FIG. 8 is a diagram illustrating the magnetic-flux density distribution around the slot opening of the stator core obtained by a magnetic field analysis.

FIGS. 6 and 7 illustrate a vertical cross section of the tooth 1b and a vertical cross section of the permanent magnet 2 at a position opposed to the tooth 1b. Assuming that a position that is at the boundary in the axial direction between the groove 2a1 and the axial-end side face 2a2 is a and a position on the axial end face 1e1 in the axial direction is b, then D1 represents the distance from the position a to the position b. The distance D1 corresponds to a half of the width from the rotor-opposing face 1b3 of the tip end portion 1b2 to the bottom face 2a11 of the groove 2a1, i.e., a half of the sum of a width G of the gap 7 and a depth D2 in the radial direction of the groove 2a1, or the distance D1 corresponds to the width from the rotor-opposing face 1b3 of the tip end portion 1b2 to the bottom face 2a11 of the groove 2a1, for example.

In the synchronous motor 100 of FIG. 6, the width from the rotor-opposing face 1b3 to the bottom face 2a11 is constant up to the boundary a that is located away from the position b of the axial end face 1e1 by the distance D1 in the axial direction. In the synchronous motor 100 of FIG. 7, the width from the rotor-opposing face 1b3 to the bottom face 2a11 is constant up to the position b of the axial end face 1e1, and the bottom face 2a11 has a circular-arc shape in which the groove gradually becomes narrow up to the boundary a that is located away from the position b of the axial end face 1e1 by the distance D1 in the axial direction.

The horizontal axis in FIG. 8 represents an axial position of the tip end portion 1b2, and each graduation represents 1 mm. The vertical axis represents the magnetic flux density at a position at which the magnetic flux density has a largest value among the positions located away from the tip end portions 1b2 illustrated in FIG. 4 by a fixed distance, i.e., the magnetic flux density in the rotation direction center portion B of the slot opening 1d. The magnetic flux density herein represents a surface density of a magnetic flux generated in a direction parallel to the rotor-opposing faces 1b3 of the tip end portions 1b2 illustrated in FIG. 4, per unit area.

The left end of the horizontal axis represents a position P1 at an axial center of the tip end portion 1b2. A solid line A represents a position P2 of the axial end face 1e1 of the tip end portion 1b2. A region on the left side of the position P2 represents a magnetic flux density in a portion where the tooth 1b and the permanent magnet 2 are opposed to each other, and a region on the right side of the position P2 represents a magnetic flux density in a portion where the tooth 1b and the permanent magnet 2 are not opposed to each other. A dotted line B represents a magnetic flux density at a position at the center position P1 in the axial direction among the positions corresponding to the bottom face 2a11 of the groove 2a1. A dotted line C represents an axial position of an intersection of the dotted line B and a curve a, i.e., a position P3 in a portion at which the magnetic flux density of the curve a has the same value as the magnetic flux density of the dotted line B.

The curve a represents a change in the magnetic flux density at a position located away from the rotor-opposing face 1b3 of the tip end portion 1b2 by the width G of the gap 7 toward the radially inner side. A curve c represents a change in the magnetic flux density at a position located away from the rotor-opposing face 1b3 of the tip end portion 1b2 toward the radially inner side by a dimension obtained by adding the width G of the gap 7 and the depth D2 of the groove 2a1 together, i.e., at the position of the bottom face 2a11 of the groove 2a1. A curve b represents a change in the magnetic flux density at an intermediate position between the above two positions, i.e., a position located away by a half of a dimension obtained by adding the width G of the gap 7 and the depth D2 together.

In an analysis model of the magnetic flux density illustrated in FIG. 8, it is assumed that the inner diameter of the stator core 1 is 50 mm, the width G of the gap 7 is 0.4 mm, and the depth D2 in the radial direction of the groove 2a1 is 1.0 mm. Therefore, the value obtained by adding the width G and the depth D2 together is 1.4 mm, and a half of the value obtained by adding the width G and the depth D2 together is 0.7 mm.

When attention is paid to the position P3 of the outer circumferential surface 2a of the permanent magnet 2 with the magnetic flux density of the dotted line B used as a reference, a width W from the position P2 to the position P3 is equal to or smaller than one graduation. The width W is a half of the width from the rotor-opposing face 1b3 of the tip end portion 1b2 to the bottom face 2a11 of the groove 2a1, and corresponds to the distance D1 illustrated in FIGS. 6 and 7, for example. This is because there is a path on which a magnetic flux generated when a current is made to flow through the winding 6 leaks in the axial direction, and the magnetic flux density in the portion where the tooth 1b and the permanent magnet 2 are opposed to each other becomes low. Therefore, near the axial end face 1e1 of the tooth 1b, the permanent magnet 2 is less demagnetized even if the permanent magnet 2 is brought close to the tooth 1b and thus a magnetic force of the permanent magnet 2 can be effectively used. Therefore, it is possible to achieve the synchronous motor 100 in which the effect of demagnetization is small.

The axial-end side face 2a2 of the permanent magnet 2 illustrated in FIGS. 6 and 7 is formed between the position located away from the axial end face 1e1 of the tooth 1b by the distance D1 in the axial direction and the axial end face 2b1 of the permanent magnet 2. Therefore, although the axial-end side face 2a2 is a portion of the outer circumferential surface 2a of the permanent magnet 2, the effect of an opposing magnetic field from the stator core 1 on the axial-end side face 2a2 of the permanent magnet 2 is the same as that on the bottom face 2a11 of the groove 2a1. In order to further reduce the effect of irreversible demagnetization, it suffices that the distance D1 is set to be the same as the distance from the bottom face 2a11 of the groove 2a1 to the stator core 1.

Further, the magnetic flux density of the curve b at the position P3 illustrated in FIG. 8 is equivalent to the magnetic flux density of the curve c at the position P2. Therefore, it is not necessary to set the depth D2 in the radial direction of the groove 2a1 to be constant up to the axial end face 2a12 as illustrated in FIG. 6. As illustrated in FIG. 7, the bottom face 2a11 can be formed up to the same position as the axial end face 1e1, and the bottom of the groove 2a1 can be changed to a circular-arc shape from the bottom face 2a11 to the position located away from the bottom face 2a11 by the distance D1.

As described above, the synchronous motor 100 according to the first and second embodiments includes the stator core 1, the rotor 5, and the cylindrical permanent magnet 2 that is disposed in an outer circumferential section of the rotor 5 and has polar anisotropic orientation. The permanent magnet 2 is longer than the stator core 1 in the axial direction. A portion of the outer circumferential surface 2a of the permanent magnet 2 that is opposed to the stator core 1 is provided with the grooves 2a1 that are formed at fixed intervals in a rotation direction at the inter-magnetic pole portions A and extend in the axial direction. The grooves 2a1 are also formed in a portion of the outer circumferential surface 2a of the permanent magnet 2 that is not opposed to the stator core 1 and is located only on one side in the axial direction of the permanent magnet 2. With this configuration, by providing the grooves 2a1 in the portion of the outer circumferential surface 2a of the permanent magnet 2 that is opposed to the stator core 1, the effect of an opposing magnetic field is suppressed to improve the torque. Further, with this configuration, the torque is further improved by using the magnetic fluxes d1 and d2 of the overhanging portions 2c1 and 2c2 that are not opposed to the stator core 1. Further, because the permanent magnet 2 is provided with the axial-end side face 2a2 at only one of the both axial end portions, it is possible to manufacture the permanent magnet 2 having a plurality of magnetic poles on its surface by injection molding; therefore, an inexpensive rotor can be achieved. Furthermore, the permanent magnet 2 can be produced by a manufacturing method and a manufacturing facility that are the same as conventional ones; therefore, an increase in manufacturing costs can be suppressed.

Further, in the synchronous motor 100 according to the second embodiment, the grooves 2a1 that are formed at fixed intervals in the rotation direction at the inter-magnetic pole portions A and extend in the axial direction are provided on the outer circumferential surface 2a of the permanent magnet 2 between the position a located away from one axial end face 1e1 of the tooth 1b by the fixed distance D1 toward the one axial end face 2b1 of the permanent magnet 2 located on the side of the one axial end face 1e1 of the tooth 1b and the other axial end face 2b2 of the permanent magnet 2. With this configuration, near the axial end face of the tooth 1b, the permanent magnet 2 is less demagnetized and thus a magnetic force of the permanent magnet 2 can be effectively used. Therefore, it is possible to achieve the synchronous motor in which the effect of demagnetization is small.

In addition, in the synchronous motor according to the second embodiment, the distance from the one axial end face 1e1 of the tooth 1b to the position a located away therefrom by the fixed distance D1 toward the one axial end face 2b1 of the permanent magnet 2 corresponds to a half of the radial-direction width from the rotor-opposing face 1b3 of the tip end portion 1b2 of the tooth 1b to the bottom face 2a11 of the groove 2a1. With this configuration, the magnetic flux generated when a current is made to flow through the winding 6 leaks in the axial direction; therefore, the magnetic flux density in a portion where the tooth 1b and the permanent magnet 2 are opposed to each other becomes low. Therefore, near the axial end face 1e1 of the tooth 1b, the permanent magnet 2 is less demagnetized and thus a magnetic force of the permanent magnet 2 can be effectively used. Therefore, it is possible to achieve the synchronous motor in which the effect of demagnetization is small.

Further, in the synchronous motor according to the second embodiment, the distance from the one axial end face 1e1 of the tooth 1b to the position a located away therefrom by the fixed distance D1 toward the one axial end face 2b1 of the permanent magnet 2 corresponds to the radial-direction width from the rotor-opposing face 1b3 of the tip end portion 1b2 of the tooth 1b to the bottom face 2a11 of the groove 2a1. With this configuration, the magnetic flux leaking in the axial direction from the end portion of the stator core 1 is less than the magnetic flux flowing from the stator core 1 to a groove. Therefore, near the axial end face 1e1 of the tooth 1b, the permanent magnet 2 is less demagnetized and thus a magnetic force of the permanent magnet 2 can be effectively used. Therefore, it is possible to achieve the synchronous motor in which the effect of demagnetization is further reduced.

Furthermore, in the synchronous motor according to the second embodiment, each of the grooves 2a1 of the permanent magnet 2 has a shape in which the depth gradually becomes larger from the one axial end face 1e1 of the tooth 1b toward the other axial end face 2b2 of the permanent magnet 2, and the bottom face 2a11 of the groove 2a1 is formed in a circular-arc shape. With this configuration, the magnetic flux density around the axial end portion of the stator core 1 gradually decreases because of the effect of leaking in the axial direction of the magnetic flux. Therefore, even when the depth of the groove 2a1 of the permanent magnet 2 is set to become gradually smaller in accordance with the gradual decrease of the magnetic flux density, the magnetic field applied from the stator core 1 is low and demagnetization does not easily occur. Therefore, it is possible to obtain more magnetic fluxes from the rotor 5 to improve the torque.

The configurations described in the above embodiments are only examples of the content of the present invention and can be combined with other well-known techniques. A part of the configurations can be omitted or modified without departing from the scope of the invention.

The invention claimed is:

1. A synchronous motor comprising:
a stator core;
a rotor disposed on an inner diameter side of the stator core; and
a cylindrical permanent magnet disposed in an outer circumferential section of the rotor, wherein
the permanent magnet is longer than the stator core in an axial direction,
the stator core includes a plurality of teeth provided at a fixed interval in a rotation direction around the stator,
a plurality of grooves are formed in a portion of an outer circumferential surface of the permanent magnet that is opposed to the stator core and in a portion of the outer circumferential surface of the permanent magnet that is not opposed to the stator core and is located only on one side in the axial direction, the grooves being formed at a fixed interval in a rotation direction of the permanent magnet and extending between a position that is located away from one axial end face of the teeth by a fixed distance toward one axial end face of the permanent magnet that is located on a side of the one axial end face of the teeth and another axial end face of the permanent magnet,
each of the grooves is formed at an inter-magnetic pole portion of the permanent magnet,
each of the grooves of the permanent magnet has a shape in which a depth gradually becomes larger toward the another axial end face of the permanent magnet from the position that is located away from the one axial end face of the teeth by a fixed distance toward the one axial end face of the permanent magnet, and
the bottom face of the grooves is formed in a circular-arc shape.

2. A synchronous motor comprising:
a stator core;
a rotor disposed on an inner diameter side of the stator core; and
a cylindrical permanent magnet disposed in an outer circumferential section of the rotor, wherein
the permanent magnet is longer than the stator core in an axial direction,
the stator core includes
an annular yoke, and
a plurality of teeth disposed on an inner diameter side of the yoke at a fixed interval in a rotation direction and extending from the yoke toward a center of the yoke,
a plurality of grooves are formed on an outer circumferential surface of the permanent magnet between a position that is located away from one axial end face of the teeth by a fixed distance toward one axial end face of the permanent magnet that is located on a side of the one axial end face of the teeth and another axial end face of the permanent magnet, the grooves extending in the axial direction and being formed at a fixed interval in a rotation direction of the permanent magnet,
each of the grooves is formed at an inter-magnetic pole portion of the permanent magnet,
each of the grooves of the permanent magnet has a shape in which a depth gradually becomes larger toward the another axial end face of the permanent magnet from the position that is located away from the one axial end face of the teeth by a fixed distance toward the one axial end face of the permanent magnet, and
the bottom face of the grooves is formed in a circular-arc shape.

3. The synchronous motor according to claim 2, wherein a distance to the position located away from the one axial end face of the teeth by a fixed distance toward the one axial end face of the permanent magnet is a distance corresponding to a half of a width in a radial direction from a rotor-opposing face of an end portion of the teeth to a bottom face of the grooves.

4. The synchronous motor according to claim 2, wherein a distance to the position located away from the one axial end face of the teeth by a fixed distance toward the one axial end face of the permanent magnet is a distance corresponding to a width in a radial direction from a rotor-opposing face of an end portion of the teeth to a bottom face of the grooves.

5. The synchronous motor according to claim 1, wherein
a distance in a radial direction from the stator core to a bottom face of the grooves is defined as a first distance,
a distance in the radial direction from the stator core to the outer circumferential surface of the permanent magnet on another end side in the axial direction is defined as a second distance, and
the second distance is shorter than the first distance.

6. The synchronous motor according to claim 1, wherein the permanent magnet has a polar anisotropic orientation.

7. The synchronous motor according to claim 2, wherein the permanent magnet has a polar anisotropic orientation.

8. A synchronous motor comprising:
a stator core;
a rotor disposed on an inner diameter side of the stator core; and
a cylindrical permanent magnet disposed in an outer circumferential section of the rotor, wherein
the permanent magnet is longer than the stator core in an axial direction,
a plurality of grooves are formed in a portion of an outer circumferential surface of the permanent magnet that is opposed to the stator core and in a portion of the outer circumferential surface of the permanent magnet that is not opposed to the stator core and is located only on one side in the axial direction, the grooves extending in the axial direction, and being formed at a fixed interval in a rotation direction of the permanent magnet,
each of the grooves is formed at an inter-magnetic pole portion of the permanent magnet,
a distance in a radial direction from the stator core to a bottom face of the grooves is defined as a first distance,
a distance in the radial direction from the stator core to the outer circumferential surface of the permanent magnet on another end side in the axial direction is defined as a second distance, and
the second distance is shorter than the first distance.

* * * * *